United States Patent
Kurtzberg et al.

(10) Patent No.: US 6,188,967 B1
(45) Date of Patent: Feb. 13, 2001

(54) AUDIO FEEDBACK CONTROL FOR MANUFACTURING PROCESSES

(75) Inventors: Jerome M. Kurtzberg; Menachem Levanoni, both of Yorktown Heights; John Stephen Lew, Ossining, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/085,061

(22) Filed: May 27, 1998

(51) Int. Cl.[7] .................................................. G06F 19/00
(52) U.S. Cl. ............................................................. 702/84
(58) Field of Search ........................................ 702/84, 182

(56) References Cited

U.S. PATENT DOCUMENTS

| | | | |
|---|---|---|---|
| 5,805,465 | * | 9/1998 | Itoh ........................................ 702/84 |
| 5,886,896 | * | 3/1999 | Lantz et al. .......................... 700/116 |
| 5,940,299 | * | 8/1999 | Choi et al. ............................ 711/163 |

* cited by examiner

*Primary Examiner*—Forester W. Isen
*Assistant Examiner*—Brian Pendleton
(74) *Attorney, Agent, or Firm*—Scully, Scott, Murphy & Presser; Stephen C. Kaufman, Esq.

(57) ABSTRACT

An arrangement and a method for the utilization of audio signals as a feedback mechanism which is employed for the controlling of manufacturing processes; particularly for monitoring the process parameters and operating conditions.

14 Claims, 2 Drawing Sheets

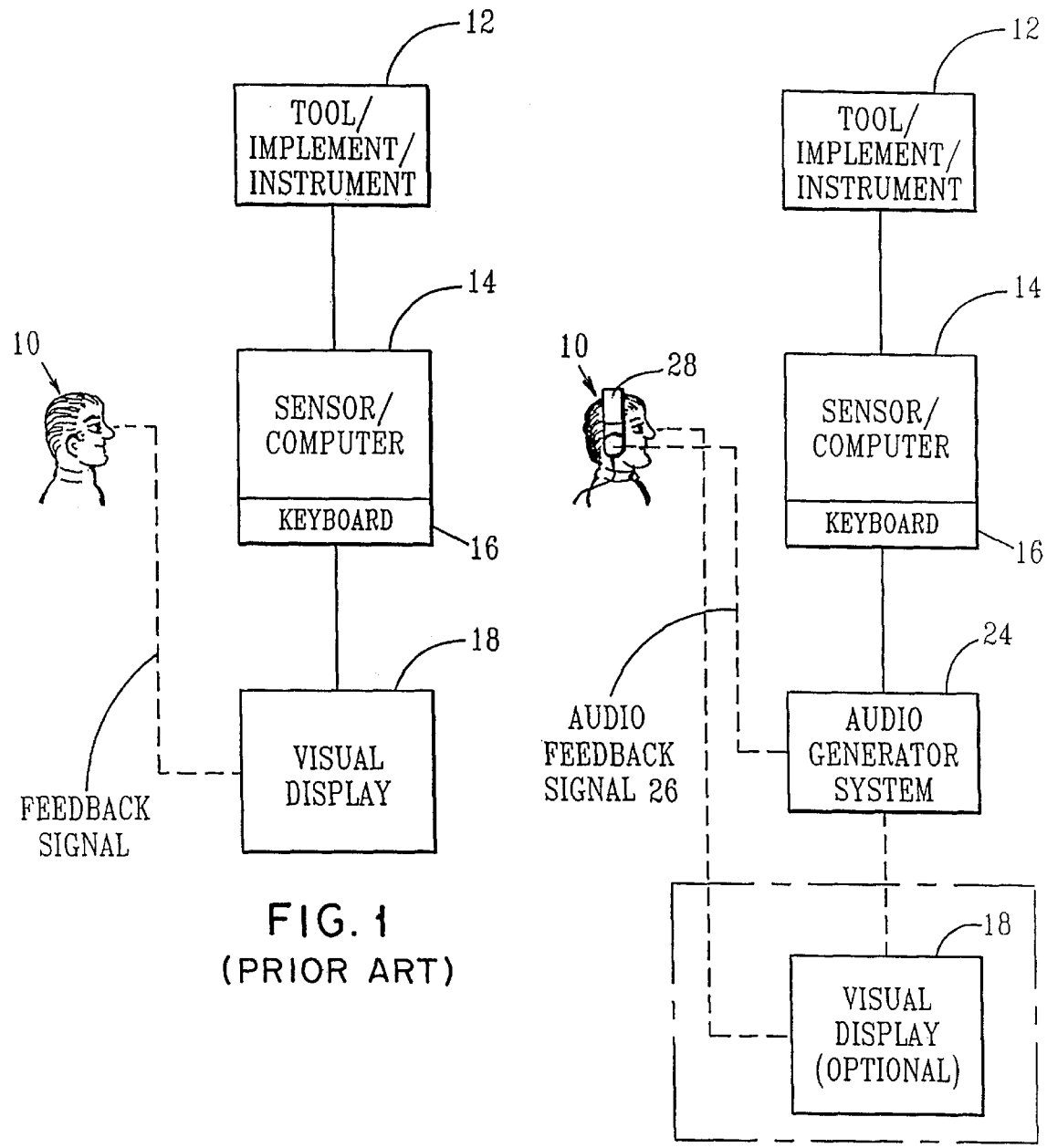

AUDIO FEEDBACK CONTROL FOR MANUFACTURING PROCESSES

BACKGROUND OF THE INVENTION

1. Field of the Invention

The present invention relates to an arrangement and to a method for the utilization of audio signals as a feedback mechanism which is employed for the controlling of manufacturing processes; particularly for monitoring the process parameters and operating conditions.

2. Discussion of the Prior Art

Currently, in the technology which encompasses manufacturing processes, signals which are employed for feedback control for the manufacturing processes, are presented visually to a user or operator online and are readily observable on a suitable display screen of a monitor. Quite frequently, feedback signals are provided in real time, but in actuality, need not necessarily be in real time, inasmuch as control charts are examples of feedback which is online, but typically is not in real time. Although in all instances, visual feedback is provided, it is nevertheless subject to considerable limitations in being able to effectuate control over manufacturing processes. For instance, it is not a readily easy task for a human observer or operator to simultaneously monitor a plurality of manufacturing process parameters, each of which may control a separate and distinct process function; and also to concurrently be able to devote adequate attention to visual monitoring. Quite frequently, the visual feedback signals are displayed in the form of representative lines on the display screen, each line being generally in a different color and designating a baseline associated with a particular process function, parameter or operating condition. When these lines fluctuate or deviate from baselines, and at times resultingly intersect or coincide, the coloring of the various displayed lines become illegible or smudged, so as to render it difficult for the observer to be able to accurately ascertain which particular manufacturing process function is subject to problems which would necessitate taking either some corrective action on the part of the user, or possibly even requiring the shut-down of the manufacturing process for more detailed investigation of the apparent process problem.

SUMMARY OF THE INVENTION

In order to improve upon and obviate the limi tations encountered in the foregoing feedback control for manufacturing processes which is in the nature of visual displays, the present invention provides for the feedback control for manufacturing processes to be in the form of audio signals which will facilitate the monitoring and controlling by a user of manufacturing processes, and enable the implementation of simultaneous corrective actions with regard to manufacturing process parameters and/or operating conditions.

In essence, the human ear is extremely efficient in separating a composite audio signal into its discrete components; for example, in a symphony it is quite easily possible to perceive, within any period of time the presence of clarinets, French horns, violins, and other types of musical instruments. On the other hand, in the employment of visual signals, particularly those represented in colors, the human eye tends to integrate the various color components; i.e. yellow and blue integrate into green, red and blue integrate into purple, and so forth, so that individual components are not readily observable and it becomes difficult for a user or operator to monitor individual manufacturing process parameters and conditions over protracted periods of time.

Pursuant to the inventive concept, there is accordingly provided an arrangement and a method for audio feedback control in which different sets of audio frequency ranges are concurrently utilized in order to facilitate the simultaneous feedback control of a plurality of manufacturing process parameters and process conditions. In essence, each of the particular audio frequency ranges may be dedicated to the control of a specific and individual process parameter, and wherein each of these audio ranges possesses a baseline representative of a proper manufacturing operation, indicative of the condition that the therewith associated process parameter is precisely on target. Moreover, audio signal variations about the baseline may be encountered, which signify actual process parameter deviations from the target, and consequently, as the process parameter deviates from its target value, the therewith associated audio signal varies in proportion with the degree of deviation, thereby continually keeping the operator of the process control system informed all times as to state of the respective process parameters which are under his supervision and control.

In accordance with a preferred feature of the invention, the audio signals may utilize audio frequency ranges which respectively simulate the sounds of specific musical instruments, which are employed in order to enhance or enable the capability of distinguishing among the various manufacturing processes and/or process parameters which are under the control of the operator. For example, each specific simulated musical instrument, such as a clarinet or the like, possesses a distinct timbre or set of timbres for its associated frequency range. Thus, it becomes possible to distinguish the difference between the high frequencies timbre and the low frequencies timbres of the clarinet in comparison with the other simulated musical instruments which are employed in generating the audio signals. Consequently, the same instrument can be utilized to control several parameters of the same manufacturing process; however, the one instrument is usually employed for controlling one parameter. The timbre of an instrument is normally generated by the addition of harmonics of varying amplitudes to its primary frequencies, which readily separates different musical instruments. As a result, the partitioning or separation of frequency ranges includes the harmonic effects which form the timbres of the various instruments. Moreover, sound value can be employed to convey information, such as the existence of a dangerous process condition or state, and that immediate attention and/or corrective action must be applied to that particular process parameter. It is also possible to utilize changes in sound tempo to convey additional information concerning the state of manufacturing process parameters; for example, to indicate fluctuations in parameter values. For instance, the faster the parameter values vary, the faster is the tempo of the therewith associated simulated musical instrument providing the audio signal.

The selection of specific musical instruments or their simulated sounds so as to produce feedback audio signals representative of specific process parameters is under the control of the operator controlling the manufacturing process. Although the foregoing, utilization of audio signals is basically intended as a substitute or replacement for currently employed visual feedback signals employed in controlling manufacturing processes or their parameters, it is possible, within the scope of the invention, that in a particular application, both audio and visual signals can be selectively or simultaneously employed to provide a feedback mechanism for an operator in order to assist the latter in controlling various manufacturing processes or process parameters and conditions, and to be able to undertake any necessary corrective action.

Accordingly, it is an object of the present invention to provide an arrangement for the generating of audio signals employable by a user as a feedback mechanism for exercising control over manufacturing processes.

It is another object of the present invention to provide an arrangement facilitating the audio feedback control of manufacturing processes in which a plurality of different audio frequency ranges or sets of ranges are employed to simultaneously control a plurality of the manufacturing process parameters and process conditions.

Yet another object of the present invention resides in the provision of a method of utilizing audio signals as a feedback mechanism for controlling manufacturing processes.

Still another object of the present invention relates to the provision of a method for utilizing audio signals for the feedback control of manufacturing process parameters and process conditions employing a plurality of audio frequency ranges which are each dedicated, respectively, to the control of a particular individual process parameter or condition.

A further object of the present invention resides in the provision of a method of utilizing feedback signals as a mechanism for the control of manufacturing process parameters and conditions through the employment of audio frequency ranges simulating concurrently the sounds of various selected musical instruments, each of which provides audio information with regard to a particular or specified process parameter or condition.

A still further object of the present invention resides in a provision of a method of utilizing audio signals as a mechanism for the feedback control of manufacturing process parameters and conditions which may be optionally combined with visual signals in order to afford an operator an expanded capability for monitoring and controlling the manufacturing processes.

BRIEF DESCRIPTION OF THE DRAWINGS

Reference may now be had to the following detailed description of a preferred embodiment of the invention, taken in conjunction with the accompanying drawings; in which:

FIG. 1 illustrates a schematic block circuit diagram of a control system utilizing visual feedback signals for controlling manufacturing processes as currently employed in the technology;

FIG. 2 illustrates a schematic block circuit diagram of a control system employing audio feedback signals for the control of manufacturing process parameters and conditions.

DETAILED DESCRIPTION OF A PREFERRED EMBODIMENT

Figure 3:
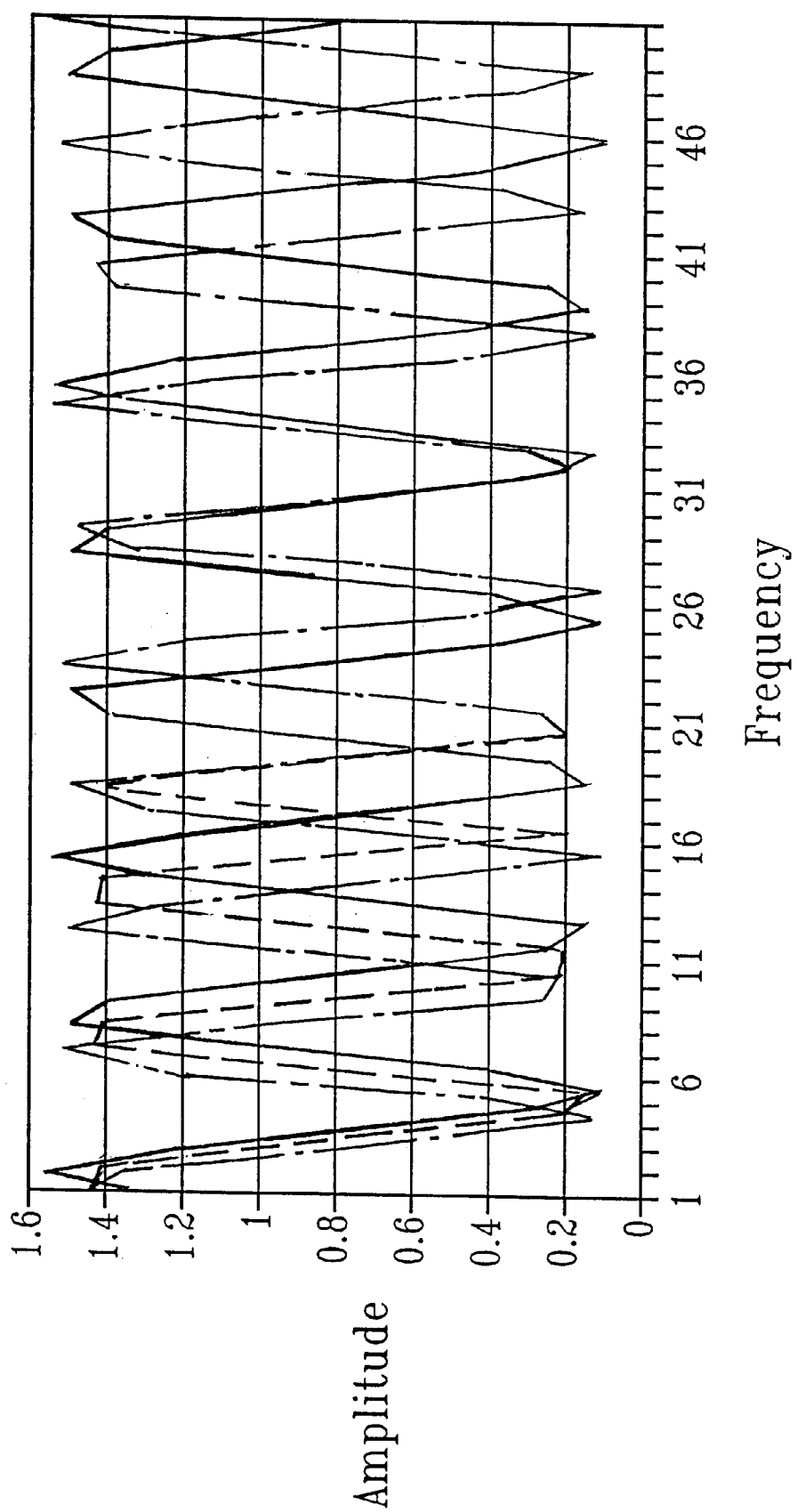
FIG. 3 illustrates a typical baseline plotted along confidence intervals for a process parameter in conjunction with associated actual parameter values at each point in time during a manufacturing process.

Referring now in particular to FIG. 1 of the drawings, there is illustrated block circuit diagram of a current system which primarily utilizes video signals provided to a user as a feedback mechanism for controlling manufacturing processes.

In that instance, by way of example, an operator 10 is adapted to exercise control over a process tool, installation or instrument 12, forming a portion of a system for implementing a manufacturing process, such as processing or treating microchips, etching wafers or the like, which, in turn, is operatively connected to a sensor and/or computer arrangement 14. The computer arrangement 14 may include a keyboard 16 under the control of the operator 10, and includes a visual display screen 18 which provides for a plurality of baseline displays each of preferably a different color representative of a specific and distinct manufacturing parameter, and which are monitored and controlled by the operator.

A feedback mechanism or control is provided through a feedback signal communicating the visual display 18 and computer arrangement 14 with the operator 10, whereby upon any occurrence of deviations in specific parameters of the manufacturing process or in a plurality of process parameters, such as by the deviations from the baselines through lines which are visually displayed becoming wavy-linear or otherwise distorted, the operator 10 is able through control of the computer and sensor to take corrective action in an effort to correct the particular deviating process parameter or parameters which have been indicated relative to a specified norm of baselines.

As previously mentioned, at times such visual feedback signals may be inadequate to distinguish deviations, errors or malfunctions in the manufacturing process parameters, conditions or equipment due to overlapping of the displayed lines, blurring of the lines and/or the blending of colors to result in unknown color combinations obscuring any corrective action which may have to be implemented; while also visual monitoring may become difficult to maintain over any protracted period of time due to potential eye weariness or strain being encountered by an operator of the control arrangement.

In order to improve upon the foregoing feedback control arrangement for monitoring maintaining processes, as illustrated in FIG. 2 of the drawings, wherein components and structures which are identical with or similar to those employed in FIG. 1, are designated with the same reference numerals, instead of a video display there is provided an audio system or unit 24 which will generate a plurality of different sounds each within respectively a particular audio frequency range, each simulating the harmonics and timbre of, for example, a specific musical instrument.

A feedback signal line 26 leading back to the operator 10 from the audio system 24 which is adapted to generate feedback audio signals within specified frequency ranges in response to particular manufacturing process parameters and conditions, is received by the ears of the operator 10, for instance, through a suitable head set or other sound-generating equipment 28. Any deviations in the sound frequencies from the baselines of predetermined frequency ranges, and changes in the timbre, pitch and/or tempo will be readily detected and classified by the auditory facilities of the operator, enabling the latter to take any corrective action with regard to any particular process parameters as required or, if necessary, even shutting down the manufacturing process in order to prevent damage being sustained by the articles being processed or by the process equipment.

In addition to the foregoing, if desired, it is also possible to retain the visual display screen 18 in the system, whereby the latter may be either bypassed and rendered inoperative, or optionally utilized in conjunction with the audio system 24 whereby feedback signals are generated to impart to the operator not only audio feedback signals but concurrently also visual feedback signals which can be utilized as a so-called back up system in ascertaining the presence of any deviations in manufacturing process parameters and conditions which may necessitate corrective action to be taken by the operator.

As illustrated graphically in FIG. 3 of the drawings, there is disclosed a baseline and confidence intervals for a particular manufacturing process parameter, in conjunction with associated actual parameter values within each point in time of a particular manufacturing process. The amplitude baseline shows upper and lower frequency limits which may be considered acceptable through the feedback signals indicative of the manufacturing process parameters and conditions. Any deviations from the baseline frequency limits which are outside of specified frequency limits, such as higher or lower frequencies of a particular sound of a simulated musical instrument, i.e. 440 frequency pitch for a simulated clarinet sound, with lower and upper frequency limits of 400–480, or a change in tempo or timbre can be readily ascertained by the auditory faculties of the operator, and will be conducive for the latter to take any corrective action in order to remedy aberrations in the particular manufacturing process parameters or conditions which have deviated from the baseline.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An arrangement for generating and transmitting audio feedback signals to a user, each being indicative of at least one specific parameter range or operating condition of a manufacturing process; said arrangement comprising:
   (a) means for implementing said manufacturing process;
   (b) means operatively connected to said process implementing means for controlling the at least one parameter or operating condition of said manufacturing process; and
   (c) means for generating a plurality of audibly distinct audio signals each representative of a specific process parameter range or operating condition, said signal generating means transmitting said audio feedback signals to said user, whereby a fluctuation of said audio signals indicative of a deviation from said process parameter range or operating condition enables said user to implement a corrective action to said manufacturing process.

2. An arrangement as claimed in claim 1, wherein said process implementing means comprises a worktool or processing implement.

3. An arrangement as claimed in claim 1, wherein said process controlling means comprises a sensor for sensing said specific process parameter range or operating condition, and a computer having said at least one process parameter range or operating condition of said manufacturing process stored in a memory.

4. An arrangement as claimed in claim 3, wherein said computer includes a keyboard adapted to be operated by said user for correcting said specific process parameter range or operative condition responsive to deviations thereof ascertained through said audio feedback signals.

5. An arrangement as claimed in claim 1, wherein visual signal generating means is operatively connected to said process controlling means for generating visual feedback signals representative of said specific process parameter range or operating condition.

6. An arrangement as claimed in claim 5, wherein said visual signal generating means is selectively operable in conjunction with said audio signal generating means.

7. An arrangement as claimed in claim 5, wherein said visual signal generating means comprises a visual display.

8. A method for generating and transmitting audio feedback signals to a user, each being indicative of at least one specific parameter range or operating condition of a manufacturing process; said method comprising:
   (a) implementing said manufacturing process;
   (b) controlling said process so as to maintain the at least one parameter or operating condition of said manufacturing process; and
   (c) generating a plurality of audibly distinct audio signals each representative of a specific process parameter range or operating condition, and transmitting said audio feedback signals to said user, whereby a fluctuation of said audio signals indicative of a deviation from said process parameter range or operating condition enables said user to implement a corrective action to said manufacturing process.

9. A method as claimed in claim 8, wherein said process comprises operating a worktool or processing implement.

10. A method as claimed in claim 8, wherein said process is controlled by a sensor for sensing said process parameter range or operating condition, and operating a computer having said parameter range or operating condition of said manufacturing process stored in a memory.

11. A method as claimed in claim 10, wherein said computer includes a keyboard adapted to be operated by said user for correcting said process parameter range or operative condition responsive to deviations thereof ascertained through said audio feedback signals.

12. A method as claimed in claim 8, wherein visual feedback signals are generated representative of said process parameter range or operating condition.

13. A method as claimed in claim 12, wherein said visual feedback signals are selectively operable in conjunction with said audio feedback signals.

14. A method as claimed in claim 12, wherein said visual feedback signals are provided on a visual display.

* * * * *